(12) United States Patent
Shaffer et al.

(10) Patent No.: US 9,306,833 B2
(45) Date of Patent: Apr. 5, 2016

(54) DATA ROUTING FOR POWER OUTAGE MANAGEMENT

(75) Inventors: Shmuel Shaffer, Palo Alto, CA (US); Sandeep J. Shetty, San Jose, CA (US); Jean-Philippe Vasseur, Saint Martin Duriage (FR)

(73) Assignee: Cisco Technology, Inc., San Jose, CA (US)

( * ) Notice: Subject to any disclaimer, the term of this patent is extended or adjusted under 35 U.S.C. 154(b) by 959 days.

(21) Appl. No.: 13/164,622

(22) Filed: Jun. 20, 2011

(65) Prior Publication Data

US 2012/0324273 A1 Dec. 20, 2012

(51) Int. Cl.
*H04W 84/18* (2009.01)
*H04L 12/751* (2013.01)
*H04L 12/703* (2013.01)
*H04L 12/26* (2006.01)

(52) U.S. Cl.
CPC ............ *H04L 45/02* (2013.01); *H04L 43/0811* (2013.01); *H04L 45/28* (2013.01); *Y04S 40/168* (2013.01)

(58) Field of Classification Search
CPC ..... H04W 84/18; H04W 24/02; H04W 52/02; H04W 52/0235; H04W 40/00; H04W 40/10; H04W 40/24
USPC .......................................................... 714/4.1
See application file for complete search history.

(56) References Cited

U.S. PATENT DOCUMENTS

| | | | |
|---|---|---|---|
| 6,954,801 B1 | 10/2005 | Housel | |
| 7,240,224 B1 | 7/2007 | Biederman | |
| 7,302,352 B2 | 11/2007 | Chuang | |
| 7,734,432 B2 | 6/2010 | Chuang | |
| 7,873,344 B2 | 1/2011 | Bowser et al. | |
| 7,902,973 B2 | 3/2011 | Thubert et al. | |
| 7,928,813 B1 | 4/2011 | Ao et al. | |
| 2006/0143583 A1 | 6/2006 | Diab et al. | |
| 2006/0164976 A1* | 7/2006 | Grover et al. | 370/228 |
| 2006/0192001 A1 | 8/2006 | Shaffer et al. | |

(Continued)

OTHER PUBLICATIONS

Pettersson, et al., "Notification of Transmittal of the International Search Report and the Written Opinion of the International Searching Authority, or the Declaration", Sep. 19, 2012, 10 pages, PCT/US2012/043280, Patent Cooperation Treaty, European Patent Office.
"RPL: IPv6 Routing Protocol for Low Power and Lossy Networks" <draft-ietf-roll-rpl-19> by Winter, at al. (Mar. 13, 2011 version).

(Continued)

*Primary Examiner* — Jigar Patel
(74) *Attorney, Agent, or Firm* — Parker Ibrahim & Berg LLC; James M. Behmke; Stephen D. LeBarron

(57) ABSTRACT

In one embodiment, a particular node in a computer network, that is, one receiving electrical power from a grid source, may determine routing metrics to a plurality of neighbor nodes of the particular node in the computer network. In addition, the node also determines power grid connectivity of the plurality of neighbor nodes. Traffic may be routed from the particular node to one or more select neighbor nodes having preferred routing metrics, until a power outage condition at the particular node is detected, at which time the traffic (e.g., last gasp messages) may be routed from the particular node to one or more select neighbor nodes having diverse power grid connectivity from the particular node. In this manner, traffic may be routed via a device that is not also experiencing the power outage condition.

22 Claims, 11 Drawing Sheets

(56) References Cited

U.S. PATENT DOCUMENTS

| | | | | |
|---|---|---|---|---|
| 2006/0262876 | A1* | 11/2006 | LaDue | 375/295 |
| 2007/0025274 | A1* | 2/2007 | Rahman et al. | 370/254 |
| 2009/0138777 | A1* | 5/2009 | Veillette | 714/748 |
| 2010/0061272 | A1* | 3/2010 | Veillette | 370/254 |
| 2010/0132010 | A1 | 5/2010 | Chatterton et al. | |
| 2011/0054709 | A1* | 3/2011 | Son | 700/286 |
| 2011/0122798 | A1* | 5/2011 | Hughes et al. | 370/254 |

OTHER PUBLICATIONS

"Routing Metrics used for Path Calculation in Low Power and Lossy Networks" <draft-ietf-roll-routing-metrics-19> by Vasseur, et al. (Mar. 1, 2011 version).

"RPL Objective Function 0" <draft-ietf-roll-of0-11> by Thubert (May 5, 2011 version).

"The Minimum Rank Objective Function with Hysteresis" <draft-ietf-roll-minrank-hysteresis-of-03> by O. Gnawali et al. (May 3, 2011 version).

* cited by examiner

DATA ROUTING FOR POWER OUTAGE MANAGEMENT

TECHNICAL FIELD

The present disclosure relates generally to electrical grids, and, more particularly, to data routing during power outages in the electrical grids.

BACKGROUND

Electric power is generally transmitted from generation plants to end users (industries, corporations, homeowners, etc.) via a transmission and distribution grid consisting of a network of power stations, transmission circuits, and substations interconnected by power-lines. Once at the end users, electricity can be used to power any number of devices.

Power outage management is one of the important features utilities look for when deploying AMI (advanced metering infrastructure) solutions. Some of the key goals of outage management are: reduction in the time it takes to identify a power outage, reduction of the time it takes to bring power up after an outage, reduction of truck rolls to fix a cascading outage, and fixing an outage before customers notice and call the utility. To this end, AMI vendor contracts often explicitly specify the time and reliability expected of "last gasp" messages from meters which lose power, such that the power outage may be effectively reported by meters noticing the loss of power. In current power outage management designs, however, such last gasp messages frequently go largely unheard.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
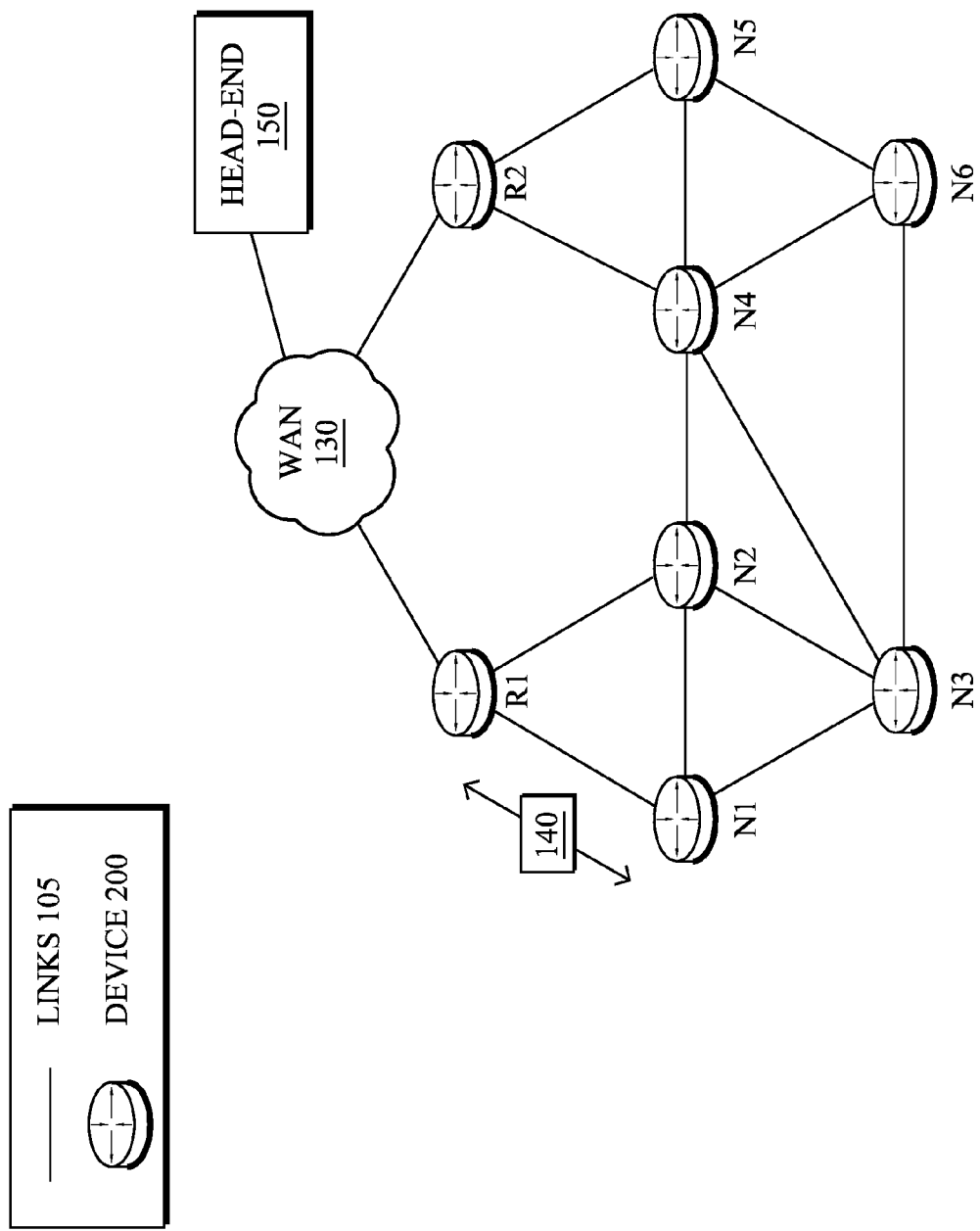
FIG. 1 illustrates an example computer network.

According to one or more embodiments of the disclosure, a particular node in a computer network, that is, receiving electrical power from a grid source, may determine routing metrics to a plurality of neighbor nodes of the particular node in the computer network. In addition, the node also determines power grid connectivity of the plurality of neighbor nodes. Traffic may be routed from the particular node to one or more select neighbor nodes having preferred routing metrics, until a power outage condition at the particular node is detected, at which time the traffic (e.g., last gasp messages) may be routed from the particular node to one or more select neighbor nodes having diverse power grid connectivity from the particular node. In this manner, traffic may be routed via a device that is not also experiencing the power outage condition.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, in particular, are a specific type of network having spatially distributed autonomous devices such as sensors, actuators, etc. For example, sensor networks, such as for "Smart Grid" and "Smart Cities" (e.g., for Advanced Metering Infrastructure or "AMI" applications), may cooperatively monitor physical or environmental conditions at different locations, such as, e.g., energy/power consumption, resource consumption, etc. Another type of smart object includes actuators, e.g., responsible for turning on/off an engine or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices.

That is, smart object networks are typically interconnected by a computer network, such as wireless networks, though wired connections are also available, and may often consist of wireless nodes in communication within a field area network (FAN). For instance, each smart device (node) in a smart object network may generally be equipped with a radio transceiver or other communication port, a microcontroller, and an energy source, such as a battery (or, in particular to the embodiments herein, a transmission grid power source). Typically, size and cost constraints on sensor nodes result in corresponding constraints on resources such as energy, memory, computational power and bandwidth. Correspondingly, a reactive routing protocol may, though need not, be used in place of a proactive routing protocol for sensor networks.

FIG. 1 is a schematic block diagram of an example computer network 100 illustratively comprising "smart" nodes/devices 200 (e.g., labeled as shown, "R1", "R2", and "N1" through "N6", and described in FIG. 2 below) interconnected by various methods of communication, such as links 105. For instance, the links between the nodes may be wired links or may comprise a wireless communication medium, where certain nodes 200 may be in communication with other nodes 200, e.g., based on distance, signal strength, current operational status, location, etc. In addition, a WAN 130 or other type of network may allow for interconnection between the nodes as shown, particularly root nodes R1 and R2, to other types of networked devices, such as a head-end device 150, e.g., a centralized management/control device or other head-end application.

Note that one example communication link 105 is powerline communication links, which often exhibit, in many ways, similar properties as wireless (radio frequency or "RF") links, such as in terms of lossiness, collisions, etc. Also, as will be understood by those skilled in the art, powerline communication systems are multi-hop systems, where even though the underlying transmission medium (the powerline) interconnects all of the nodes (e.g., like a broadcast domain), nodes in a PLC network communicate with each other over the transmission medium through other nodes relaying/routing messages.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

Data packets 140 (e.g., traffic and/or messages) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
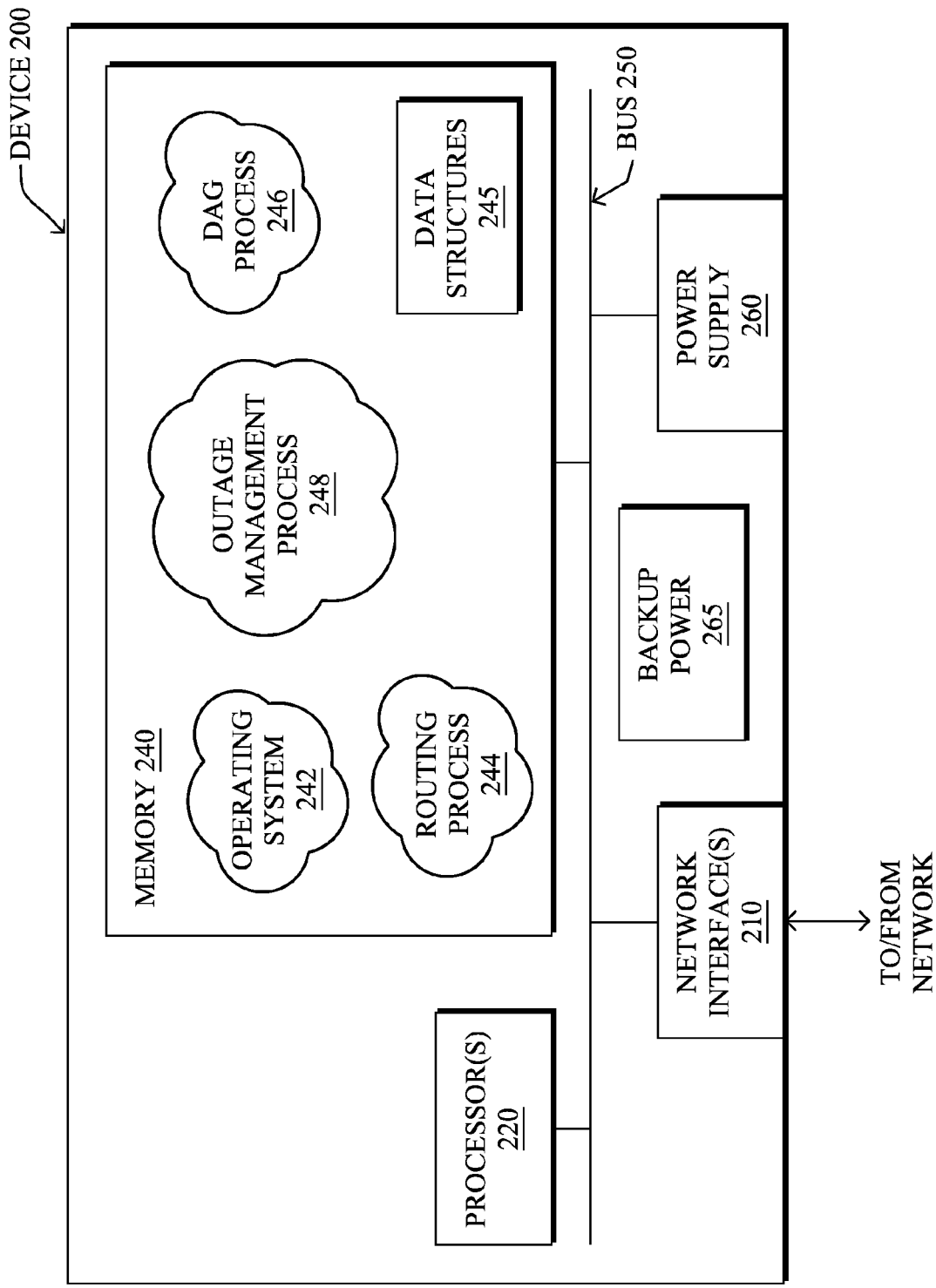
FIG. 2 illustrates an example device/node.

FIG. 2 is a schematic block diagram of an example node/device 200 that may be used with one or more embodiments described herein, e.g., as a device R1, R2, and N1-N6 in the network 100. The device may comprise a network interface 210, a processor 220, and a memory 240 interconnected by a system bus 250. Notably, the device may also be powered by a primary power supply 260 (e.g., a "plug-in" power supply to receive electrical power from an electric grid source), and a backup power supply 265, such as a battery or capacitor/capacitance backup, which could allow for operations of the device 200 to continue for a short (or long) period of time after the loss of primary power to supply 260.

The network interface 210 contains the mechanical, electrical, and signaling circuitry for communicating data over physical and/or wireless links coupled to the network 100. The network interface may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, broadband over power lines (BPL), etc. Note that certain devices may have two different types of network connections 210. For instance, devices may have one or more interfaces used to communicate with other devices within the computer network (e.g., a mesh cell), and for certain other devices ("root" devices), another interface may be used as a WAN uplink network interface between the root node and, for example, a head-end device 150 located through the WAN 130.

The memory 240 comprises a plurality of storage locations that are addressable by the processor 220 for storing software programs and data structures associated with the embodiments described herein. Notably, certain devices may have limited memory or no memory (e.g., no memory for storage other than for programs/processes operating on the device). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, an illustrative outage management process 248 may also be present in memory 240, for use as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
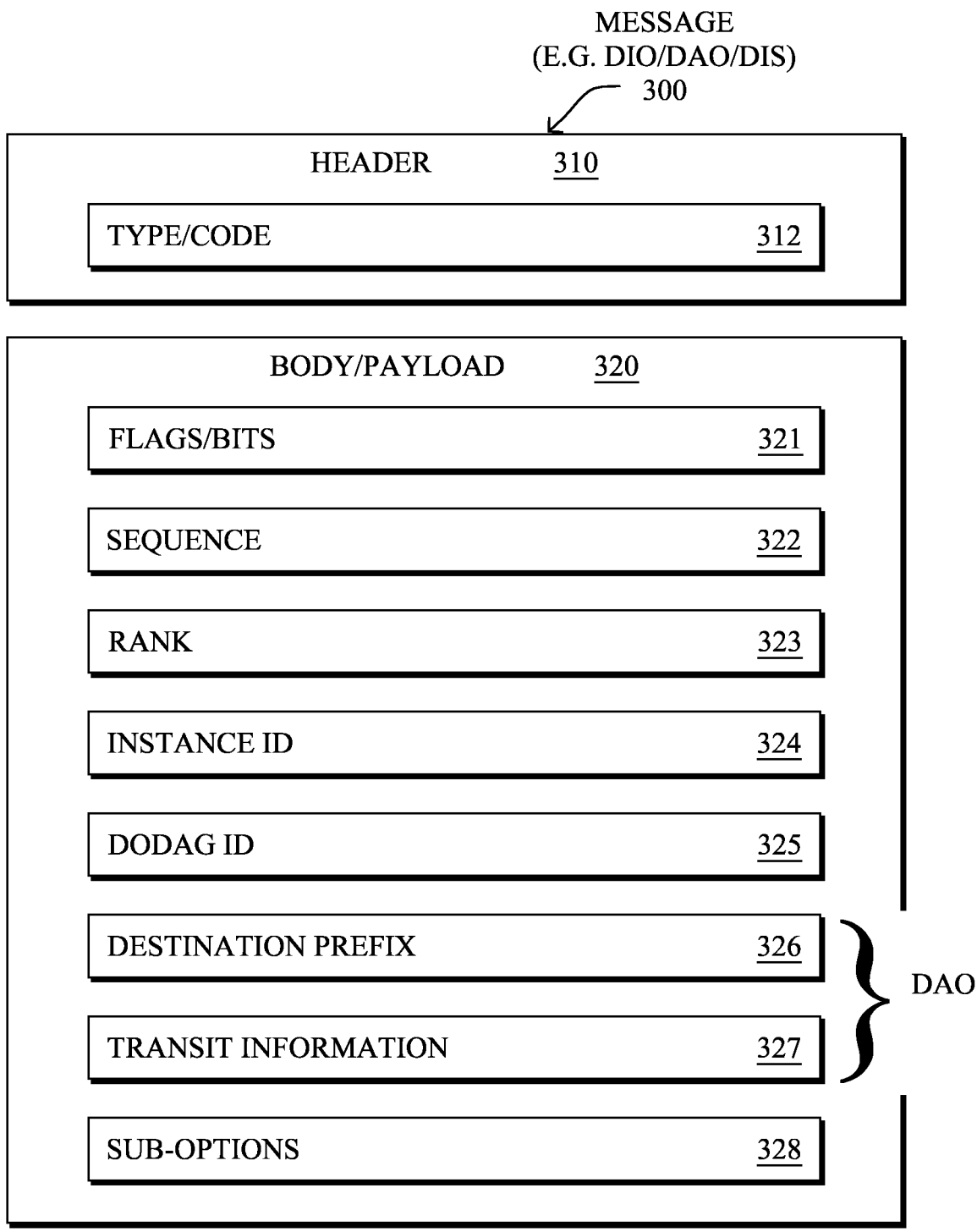
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
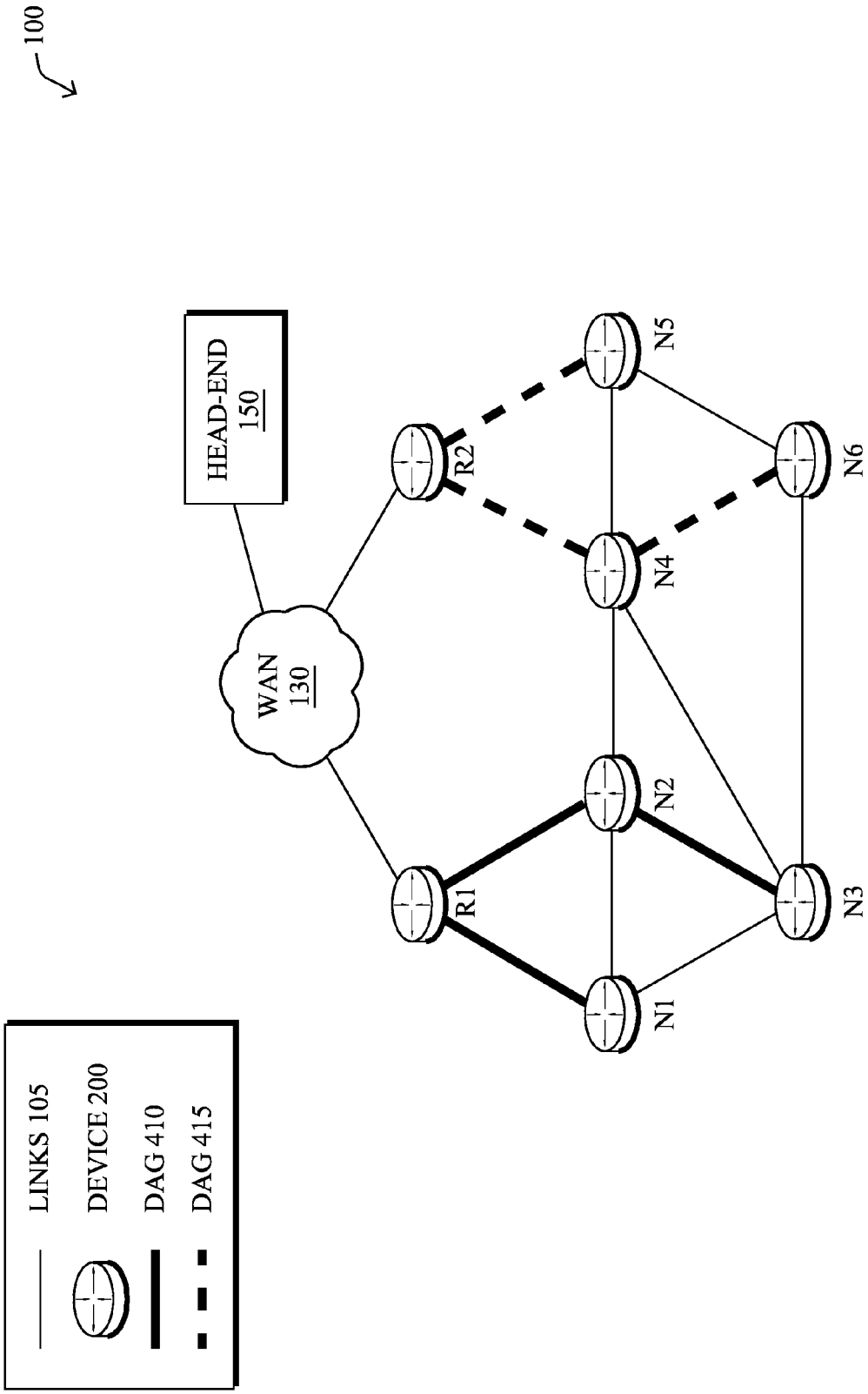
FIG. 4 illustrates example directed acyclic graphs (DAGs) in the computer network of FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAGs 410 (shown as bolded lines) and DAG 415 (shown as bolded broken lines), which extend from the respective root node R1 or R2 toward one or more leaf nodes (nodes without children). Traffic/packets 140 (shown in FIG. 1) may then traverse the DAGs 410/415 in either the upward direction toward the root or downward toward the leaf nodes, particularly as described herein.

As noted above, electric power is generally transmitted from generation plants to end users (industries, commercial, residential, etc.) via a transmission grid consisting of a network of power stations, transmission circuits, and substations interconnected by power lines. Once at the end users, electricity can be used to power any number of devices, such as devices 200.

Figure 5:
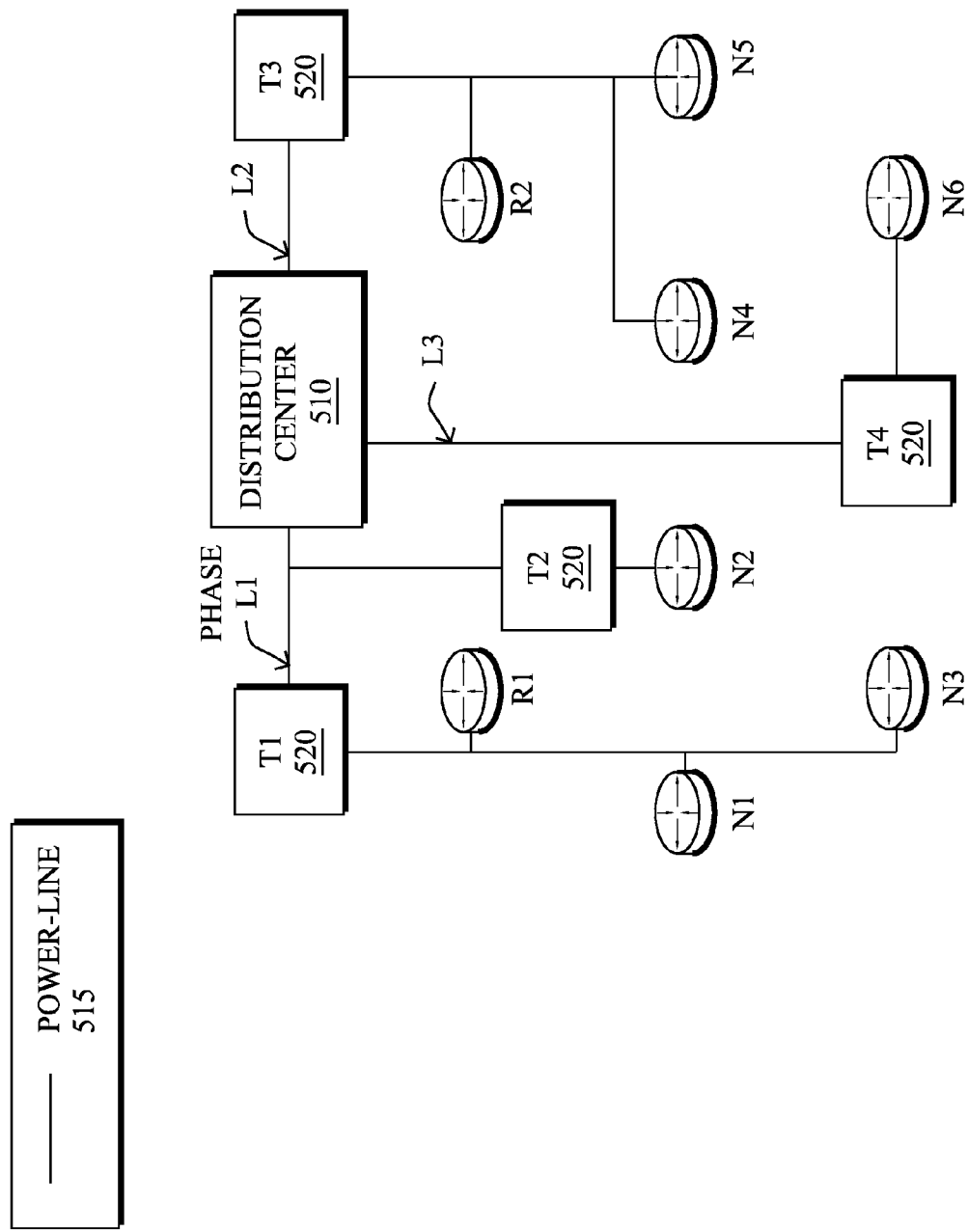
FIG. 5 illustrates an example electric distribution grid underlying the computer network of FIG. 1.

FIG. 5 illustrates an example electric power transmission and distribution grid 500 to the example devices 200 of FIG. 1, above. (Note that although the terminology herein often refers to either "transmission" or "distribution," those skilled in the art will recognize that the embodiments herein may broadly cover both the transmission and distribution portion of the grid.) For instance, a distribution center 510 (e.g., generation plant, transformer station, substation, etc.) supplies electricity over a plurality of distribution lines 515 to the devices 200. Note that one or more transformers 520, e.g., "T1" through "T4", may be used to relay electricity to particular devices as shown.

In the embodiments herein, the supplied electricity may be part of a polyphase source system, where a plurality of phases (e.g., three) are carried over the lines 515 to the devices, such that each device is generally attached to a particular phase (or phases) of the electric grid. As shown, electrical power of three phases, L1, L2, and L3, is supplied to the devices. Notably, the view shown herein is vastly simplified, as each phase may generally be used to power entire buildings, neighborhoods, etc, and may also supply power to many (e.g., tens, hundreds, thousands) of devices within those establishments. Also, while the view shown herein is generally arbitrarily connected, phase-based distribution grid topologies generally result in "clusters" of like-phased devices (e.g., those within the buildings, neighborhoods, etc.).

As noted above, power outage management is one of the important features utilities look for when deploying AMI (advanced metering infrastructure) solutions. Some of the key goals of outage management are: reduction in the time it takes to identify a power outage, reduction of the time it takes to bring power up after an outage, reduction of truck rolls to fix a cascading outage, and fixing an outage before customers notice and call the utility. To this end, AMI vendor contracts often explicitly specify the time and reliability expected of last gasp power outage notification (PON) messages from meters which lose power, such that the power outage may be effectively reported by meters noticing the loss of power to head-end application 150. In current power outage management designs, however, such last gasp PON messages frequently go largely unheard.

For example, current systems may send a short burst of last gasp messages (e.g., three) without listening to and/or forwarding any of the messages from deeper within the mesh (e.g., from children nodes). At best, this method allows for the first order children of a still-powered relay/router to send their last gasp notification to the head-end. In particular, outage notifications from second and higher order children cannot be communicated to the head-end in this configuration because the first order children power down their receivers to conserve last gasp energy. As an alternative example, other current systems may attempt to broadcast last gasp messages so any listening receiver may receive and process such last gasp messages. However, there is no guarantee that listening receivers will be on the same frequency/channel as the blindly broadcast transmission, and there may not be sufficient backup power to attempt to broadcast the messages on every possibly frequency/channel used in the network 100.

The techniques herein, therefore, provide a method for enhancing outage management by optimizing mesh routing as to maximize the reachability of nodes (e.g., AMI meters) and to increase the number of last gasp and power restoration messages received by the outage management system in the head-end 150. In particular, the techniques herein propose to use knowledge of the power distribution network (grid 500) topology to improve routing during failure scenarios, such that routes (e.g., backup routes) are chosen to favor those paths that do not share the same source/feeder or distribution phase in the event of a power outage.

Specifically, according to one or more embodiments of the disclosure as described in greater detail below, a particular node in a computer network, that is, one receiving electrical power from a grid source, may determine routing metrics to a plurality of neighbor nodes of the particular node in the computer network. In addition, the node also determines power grid connectivity of the plurality of neighbor nodes. Traffic may be routed from the particular node to one or more select neighbor nodes having preferred routing metrics, until a power outage condition at the particular node is detected, at which time the traffic (e.g., last gasp messages, such as last gasp PON messages) may be routed from the particular node to one or more select neighbor nodes having diverse power grid connectivity from the particular node. In this manner, traffic routing is attempted via a device that is not also experiencing the power outage condition.

Illustratively, the techniques described herein may be performed by hardware, software, and/or firmware, such as in accordance with outage management process 248, which may contain computer executable instructions executed by the processor 220 to perform functions relating to the novel techniques described herein, e.g., in cooperation with routing process 244 and/or DAG process 246. For example, the techniques herein may be treated as extensions to conventional communication protocols, such as the RPL protocol, and as such, would be processed by similar components understood in the art that execute such protocols, accordingly.

Operationally, the techniques herein illustrative optimize AMI mesh network routing in order to maximize the number of nodes which would be able to notify the head-end 150 regarding an outage. To this end the system determines power grid connectivity (or "power system topology") of network nodes, and classifies each mesh node including the root (gateway, relay, router) according to their connectivity. For example, the connectivity may be based on which phase (e.g., L1, L2, or L3) of the grid is the device connected, or from which transformer (e.g., T1-T4) is the device powered, or other methods for determining a specific "power flow" corresponding to the particular devices in the grid topology 500 above.

Notably, exactly how the power grid connectivity is determined is outside the scope of the present disclosure. Various example concepts of mapping devices/meters to the electric grid have been proposed, such as from static databases which have been populated manually or via automated techniques to account for differences between "as-built" and "as-operated" configurations, e.g., due to power restorations, reconnections, etc. For instance, certain geographic information systems (GIS) techniques may determine a device's phase, connectivity to particular transformers, or other grid topology indicators, such as satellite-based GPS) location mapping, etc. Another example is a system wherein each time switches in a substation change the topology of the downstream grid, the logic which changes the electric grid notifies and updates the system about the new topology. Other techniques are available and/or will be continue to be developed, and each technique may be used with the embodiments herein.

A system in accordance with the techniques described herein may improve the reliability of outage management by employing different modes of routing preferences: one for conventional (normal power) routing, one for power outage conditions (e.g., for outage notifications), and another for power restoration. In the first (normal) mode, nodes in the network may determine routing metrics to neighbor nodes, and may route traffic to one or more select neighbor nodes having preferred routing metrics. As an illustrative example, by the select neighbor nodes may be selected parents in a DAG based on the routing metrics. For instance, assume node N3 is operating in normal mode, and as such, may route traffic (packets 140) to node N2 based on the DAG 410.

In accordance with one embodiment, as second order children/nodes select their parent, in addition to examining information such as signal strength (e.g., received signal strength indication or "RSSI"), the nodes may also exchange information about the grid topology 500 from which their potential parents obtain power. Based on attempting to obtain diverse power grid connectivity (e.g., different phase, power sourced from different transformers, etc., depending upon availability and/or configuration), the nodes may select another parent in a second DAG for use in the power outage condition mode.

Figure 6A:
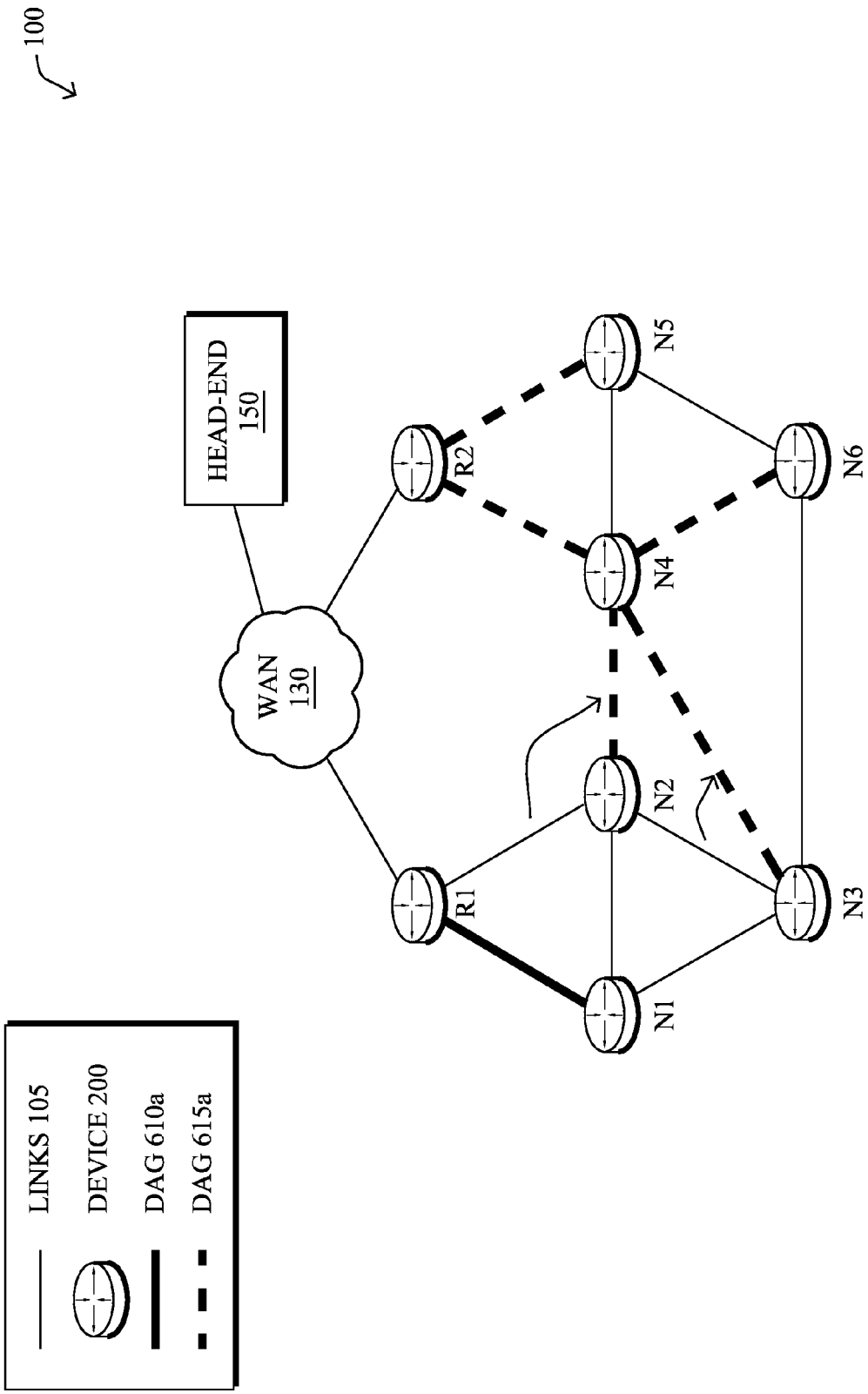
FIGS. 6A-6B illustrate other example DAGs in the computer network of FIG. 1 based on the underlying grid in FIG. 5.
Figure 6B:
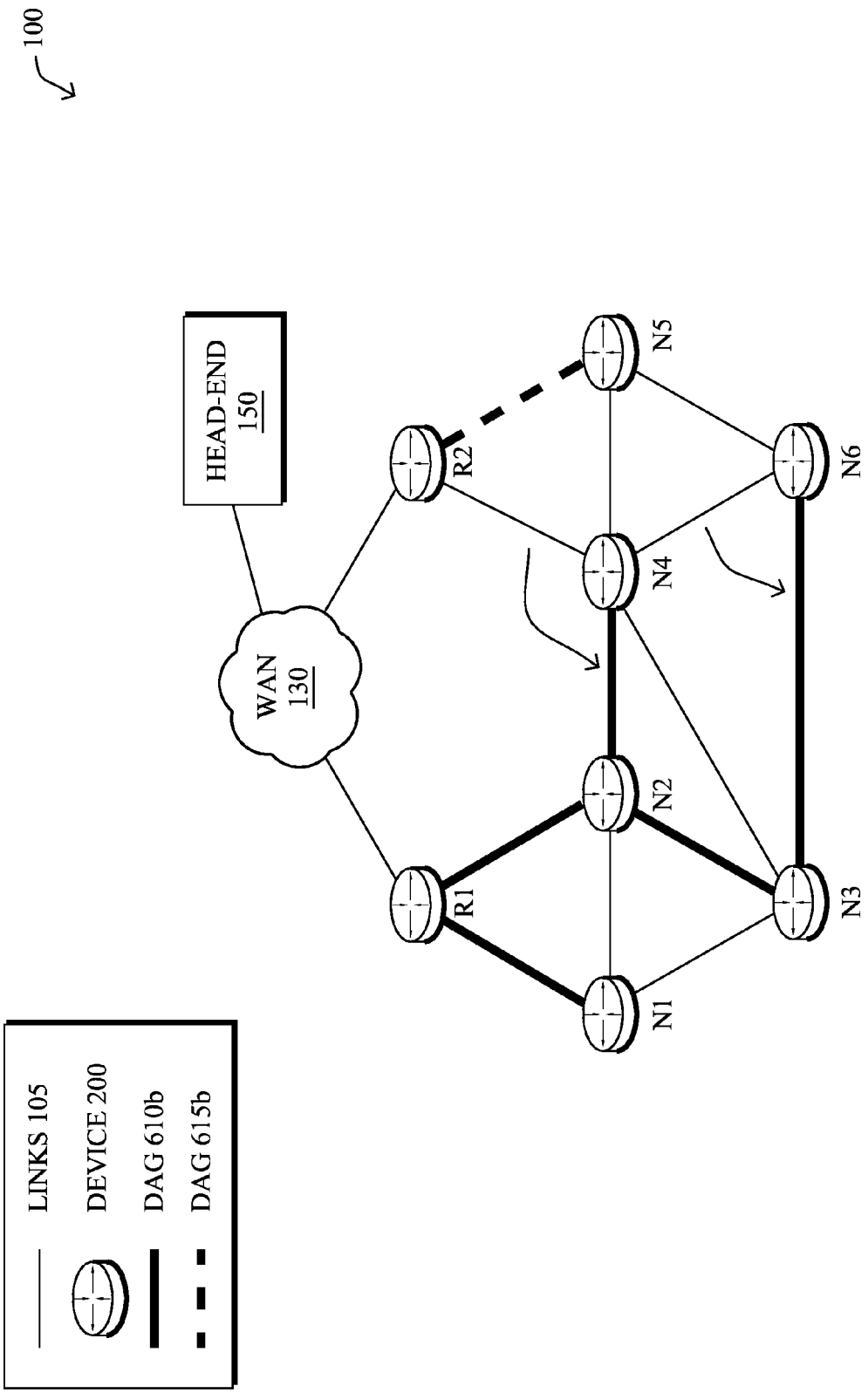

FIGS. 6A-6B illustrate an example set of DAGs 610/615 that may be created in response to diverse power grid connectivity. Illustratively, as the nodes select their parent for these DAGs, the route selection algorithm (such as RPL) gives preferential treatment to routes which would facilitate information flow through nodes which are fed through a different data path than the path of the power supply. In other words, parents may be selected to avoid parents of the same power connectivity (same phase, same transformer, etc.), or otherwise to specifically select parents of a different power connectivity. As shown in FIG. 6A (and with reference to the underlying grid topology 500 of FIG. 5), assume that node N3 and node N2 may each select node N4 as their alternate parent node. As shown in FIG. 6B, node N4 may select node N2, and node N6 may select node N3 as alternate parents. Note that FIG. 6A illustrates the DAG 615*a* that could be used when N2 and N3's power fails (and what is left of DAG 610*a*), while FIG. 6B illustrates the DAG 610*b* that could be used when N4 or N6's power fails (and what is left of DAG 615*b*). This is because when a power outage condition occurs in one section of the grid, the nodes in the unaffected section would maintain their original DAG routing.

According to the example, therefore, with existing algorithms node N3 would select node N2 as its parent. However in accordance with the power outage algorithm, node N3 would prefer to send its last gasp messages via node N4, which may, though need not, be in a different mesh cell (e.g., DAG). For instance, node N6 need not change its routing preference, since its parent node N4 is already on a power-diverse topology. Note that where a different cell (e.g., DAG) is encountered, a completely different frequency hopping sequence and/or timeslot clock may be used than the original DAG. This is important to point out, since it shows how transmitting a broadcast message, with the goal that some receiver will hear it, will not always work.

In the event no power-diverse parent solution is found, such as for node N1, parents may still be selected based on routing metrics, as in DAGs 410/415 above. (Note that it may be possible to select parents with parents, i.e., grandparents, that are power-diverse, such as node N1 using node N2 to reach node N4. However, the more simplistic view is shown herein for clarity of understanding.) The same use of route metrics may be applied when multiple power-diverse parents are available, such as node N3 selecting node N4 over node N6 based on such metrics, accordingly. Note further that the alternate parent selection may generally be performed prior to detecting the power outage condition, or, if there is time (or limited memory to store both sets of parents), then the alternate parent selection may occur in response to the power outage condition.

When a power outage condition is detected at the particular node, such as when the particular node's power supply 260 fails (i.e., the grid source is down), and is operating on backup power 265, then the node may revert to the power outage mode to route traffic (140) to the one or more select neighbor nodes having diverse power grid connectivity from itself. Illustratively, the routed traffic in this mode may generally consist of last gasp PON notifications in an attempt to notify the head-end 150 of the power outage condition, and as such, by routing to devices with diverse power connectivity, the intention being that those other nodes have not also lost power, and the messages can reach the head-end 150.

Of course, as will be appreciated by those skilled in the art, those other devices may also have lost power, and the messages may still not reach the intended recipients. Moreover, the realized benefits of the techniques herein may vary depending upon the specific neighborhood grid topology (distribution portion). For instance, when a neighborhood is fed from a three phase grid and a fault occurs in one of the phases (while the other two phases remain operational), the topology aware mesh routing in accordance with the techniques herein ensures that the outage messages are reliably transmitted to the head-end. For example, assume that all meters connected to phase L1 find a route to the DAG root via meters which are connected to phases L2 and L3. All of the meters which are connected to phase L2 find a route to the DAG root via meters which are connected to phases L1 and L3, and all of the meters which are connected to phase L3 find a route to the DAG root via meters which are connected to phases L1 and L2. When a fault occurs in any of the three phases, the meters that lose power use the nodes (meters) that are connected to the other phases to convey the fault condition to the head-end (e.g., supervisory control and data acquisition or "SCADA" center). This example demonstrates how taking the electric grid topology into account when building the routing topology can make a significant difference in improving the fault notification reliability. In another example, meters may not be able to find an alternate that is not on the same feeder except in areas where the feeders happen to be close enough for meter network to span two feeders: for more localized outages (e.g., limited to a single distribution transformer, or where a "lateral" experiences a blown fuse), access to power-diverse nodes (e.g., on a different transformer or on the main feeder) may be more possible than in other instances.

Figure 7A:
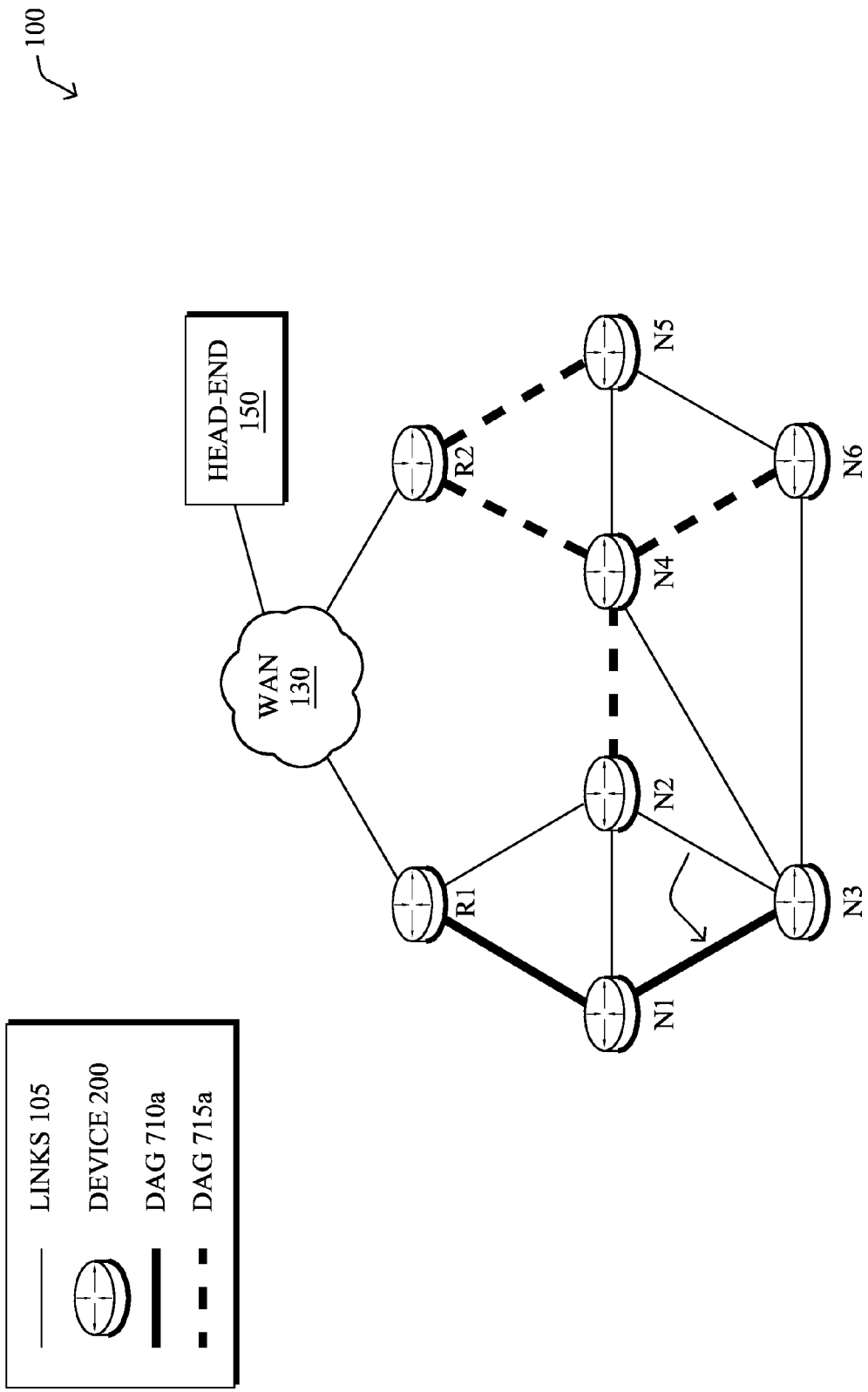
FIGS. 7A-7B illustrate other example DAGs in the computer network of FIG. 1 based on the underlying grid in FIG. 5.
Figure 7B:
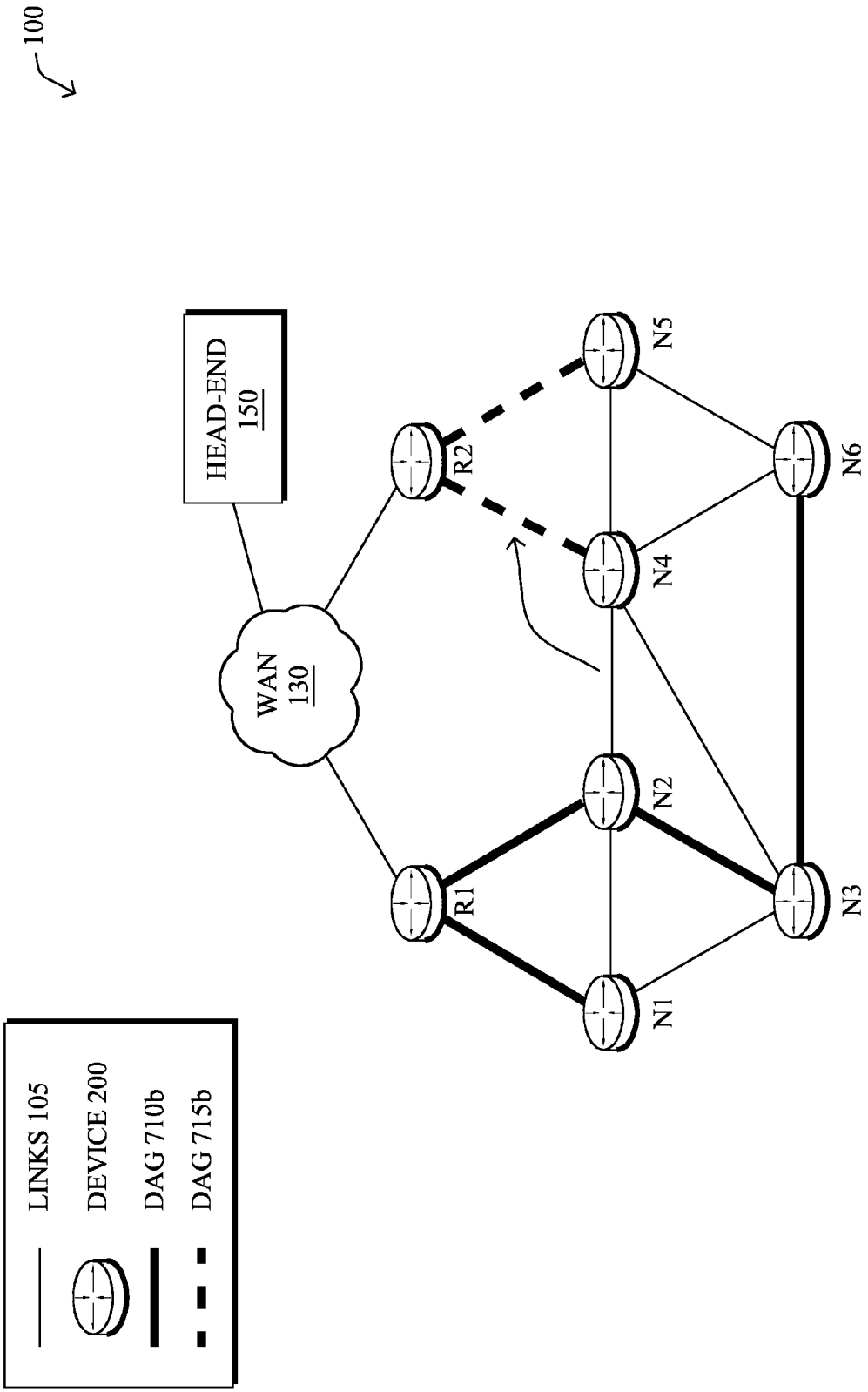

As the power is restored after the power outage condition, the nodes determining the power restoration may changes their routing preferences and utilize node that have the same power grid connectivity as themselves. In particular, this is done because a node can assume that the power to other devices from its own transformer (or on its own phase) has been restored, while the power to other nodes powered by other sources (other transformers and/or phases) is not known. As an example shown in FIGS. 7A-7B (DAGS 710a/715a or 710b/715b from similar DAGs in FIGS. 6A-6B), node N3 may select node N1 in response to determining a power restoration (e.g., in a DAG 710a or otherwise), since node N1 has the same transformer T1, while node N4 may return to the root node R2 (e.g., in DAG 715b). Notably, in response to determining that the one or more select neighbor nodes with preferred routing metrics, have power from the grid (e.g., node N3 determining that node N2 has power, such as from an explicit notification or based on receiving a message from node N2), then traffic routing may resume to those select neighbor nodes (e.g., DAGs 410/415 above), accordingly.

In accordance with yet another aspect of the embodiments herein, though as described above the system may establish an optimal RPL route table (e.g., DAGs 410/415) in a conventional manner while in parallel building contingency routes for outage management, the techniques above may allow for the power outage condition mode to be a more permanently utilized management mode. That is, rather than alternating between routing-metric-based routing and power-connectivity-based routing, certain embodiments may simply maintain a power-connectivity-based routing paradigm for ease of operation and reduced resource utilization (memory and/or processor). Note that in the maintained power-connectivity-based routing paradigm, the power-restoration mode may still be applicable as well.

Note further that in one or more additional embodiments, detecting a power outage condition could be based on receiving a trigger (e.g., an explicit control message from a head-end 150) for advance protection in response to a power-outage-causing condition. For example, when a storm approaches and there is a risk of damage to the electric infrastructure, the system may notify its mesh network of this condition and commands it to evolve to the power-outage-condition-based routing (e.g., "storm routing"), which would better facilitate power outage management while temporarily slowing down normal meter data management information flow. After the storm clears and the outage restoration is done, the system would notify the various nodes to revert to the normal routing tables, thus returning to routing traffic to nodes based on preferred routing metrics in response to an end of the power outage condition.

Figure 8A:
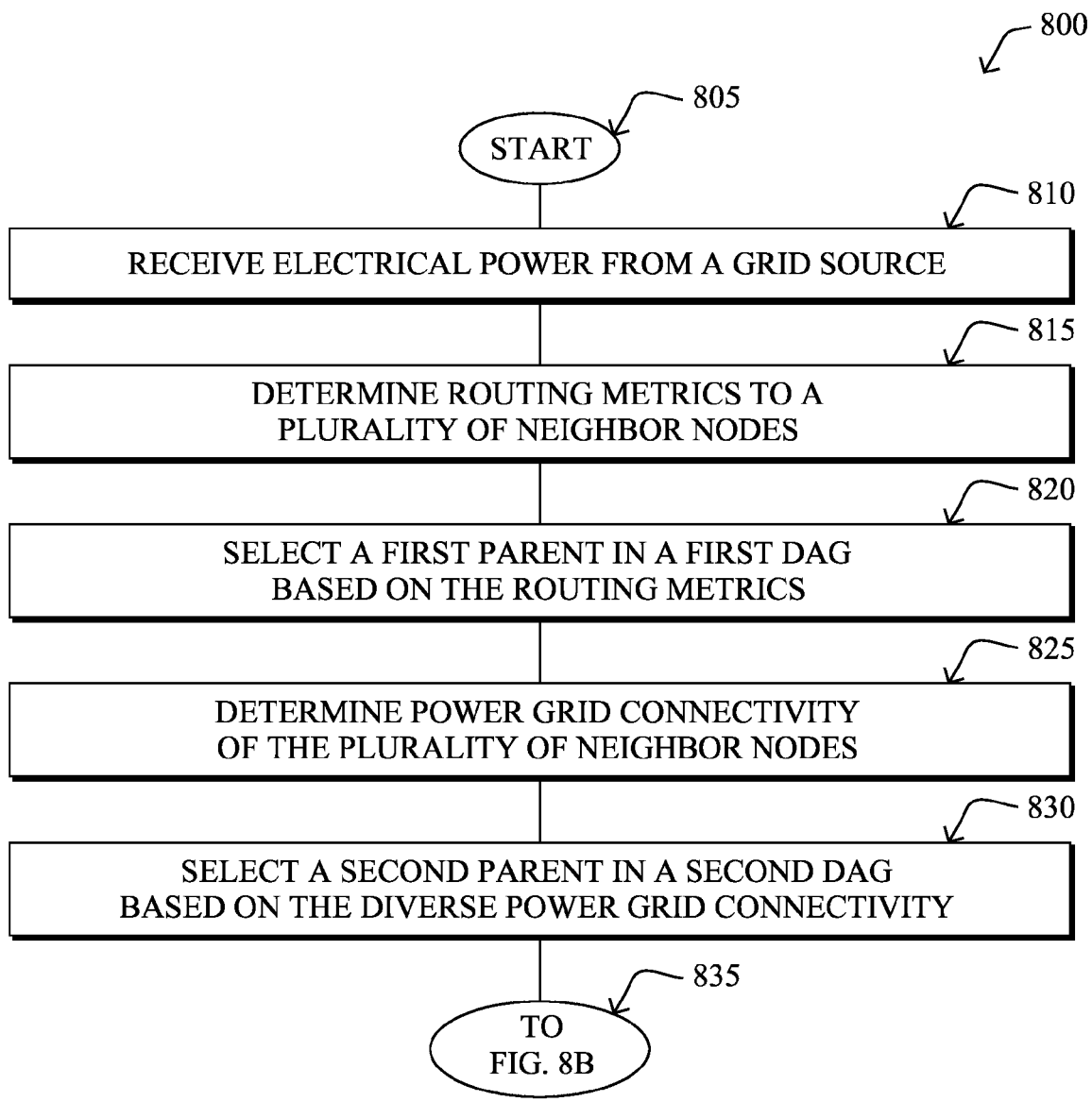
FIGS. 8A-8B illustrate an example simplified procedure for enhancing power outage management through intelligent data routing.
Figure 8B:
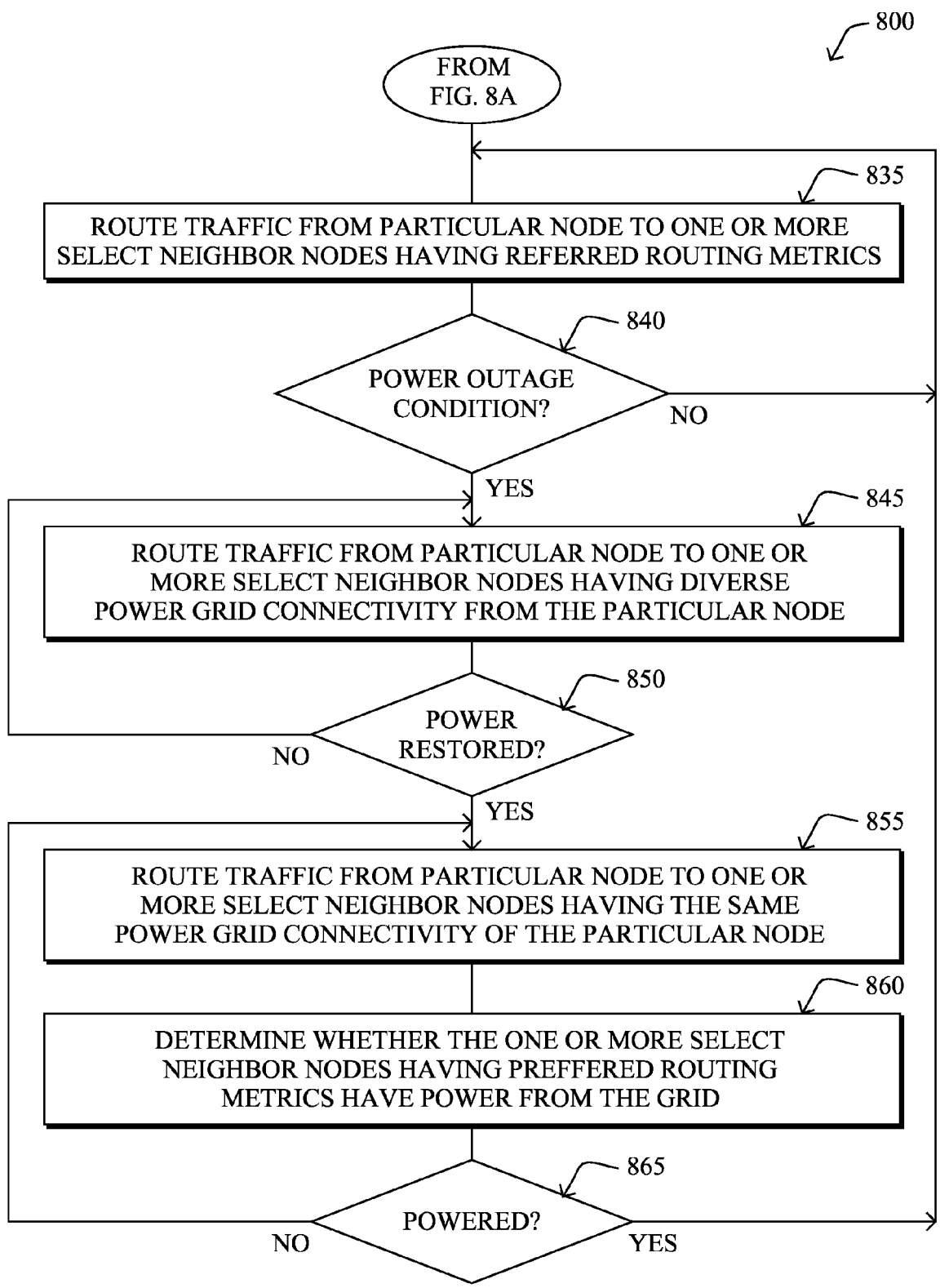

FIGS. 8A-8B illustrate an example simplified procedure for enhancing power outage management through intelligent data routing in accordance with one or more embodiments described herein. The procedure 800 starts at step 805 in FIG. 8A, and continues to step 810, where, a particular node (e.g., N3) receives electrical power from a grid source 500. As described in greater detail above, in step 815 the particular node determines routing metrics to a plurality of neighbor nodes, and may optionally select a first parent in a first DAG 410 based on the routing metrics in step 820. In addition, in step 825, the particular node may also determine power grid connectivity of the plurality of neighbor nodes, and may also optionally select a second parent in a second DAG 610 based on the diverse power grid connectivity in step 830 (e.g., in advance of any power outage conditions).

Continuing to FIG. 8B, in step 835, under "normal" power conditions, the particular node may route traffic (e.g., sensed/metered data) to one or more select neighbor nodes having preferred routing metrics, such as according to the DAG 410 (e.g., N2). In response to a power outage condition in step 840, however, the particular node may then begin routing traffic in step 845 to one or more select neighbor nodes having diverse power grid connectivity from the particular node, such as according to the DAG 610 (e.g., N4). Illustratively, such last gasp messages in step 845 (e.g., PON messages) are transmitted via a node with a diverse power grid connectivity with the goal that they will reach the head-end 150 to report the outage condition.

The grid-based routing may continue in step 845 until either the backup power source 265 is depleted, or until in step 850 the main power (to power source 260) is restored. In response to restored power, as noted above, in step 855 the traffic (e.g., initial restoration traffic) may be routed from the particular node to one or more select neighbor nodes having the same power grid connectivity of the particular node (e.g., N1), such as according to DAG 710. Once it can be determined that the one or more select neighbor nodes having preferred routing metrics (e.g., N2) have power from the grid in steps 860 and 865, then the particular node may resume routing traffic to the one or more select neighbor nodes having preferred routing metrics (e.g., N2) as in step 835.

It should be noted that while certain steps within procedure 800 may be optional as described above, the steps shown in FIGS. 8A and 8B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for enhanced power outage management through intelligent data routing. In particular, the novel techniques provide for enhancing outage management, e.g., by optimizing mesh routing, to maximize the reachability of nodes (e.g., AMI meters) and to increase the number of last gasp and power restoration messages received by an outage management system in the head-end. Specifically, the techniques herein improve the reliability of outage management by facilitating information flow from a larger number of nodes in the system, such as by employing different optimized routes for last gasp and for restoration messages. Unlike conventional networking techniques for backup paths, however, the techniques herein optimize routing according to the physical topology of the electric grid, rather than according to the computer network topology. In addition, the techniques herein provide a system that improves outage notification without requiring deployment of new hardware, and can be used by new hardware and legacy hardware alike.

Note that there is generally no solution that can guarantee that all (100%) of the last gasp messages (e.g., PON messages) arrive at their intended destination (e.g., the power outage management system). However, it should be noted that restoring power to end customers even a single minute earlier can improve the reliability indicators such as, e.g., SAIDI (system average interruption duration index), CAIDI (customer average interruption duration index), MAIFI (momentary average interruption frequency index), etc., and consequently result in millions of dollars saved by utility companies.

While there have been shown and described illustrative embodiments that enhance power outage management through intelligent data routing, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols, particularly those utilizing DAG routing (e.g., distance vector protocols). At the same time, however, the embodiments above are not limited to DAG routing, and may utilize other forms of route-topology management. Moreover, while much of the focus of the data routing has been with reference to meter data routing for AMI, other types of data may also benefit from last gasp management, such as other types of sensors, generally, or even any conventional (e.g., high priority) computer network communication. Accordingly, the techniques herein are not limited to meters last gasp messages, and the routed last gasp "traffic" from devices losing power may be any type of transmitted message.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, by a particular node in a computer network, electrical power from a grid source;
    determining, by the particular node, routing metrics to a plurality of neighbor nodes of the particular node in the computer network;
    determining, by the particular node, power grid connectivity of the plurality of neighbor nodes, wherein determining the power grid connectivity of the plurality of neighbor nodes includes determining which transformer sources electrical power for each of the plurality of neighbor nodes or determining which polyphase electrical system acts as the grid source for each of the plurality of neighbor nodes;
    routing, by the particular node, traffic from the particular node to one or more select neighbor nodes having preferred routing metrics;
    detecting a power outage condition at the particular node;
    in response to the power outage condition, routing, by the particular node, traffic from the particular node to one or more select neighbor nodes having diverse power grid connectivity from the particular node; and
    returning to routing traffic from the particular node to the one or more select neighbor nodes having preferred routing metrics in response to an end of the power outage condition.

2. The method as in claim 1, further comprising:
    selecting a first parent in a first directed acyclic graph (DAG) from the plurality of neighbor nodes based on the routing metrics; and
    selecting a second parent in a second DAG from the plurality of neighbor nodes based on the diverse power grid connectivity.

3. The method as in claim 2, wherein selecting the second parent is performed prior to detecting the power outage condition.

4. The method as in claim 1, wherein the power outage condition is detected based on operating on backup power when the grid source power is down.

5. The method as in claim 4, wherein the backup power is one of either a battery backup or a capacitance backup.

6. The method as in claim 1, wherein detecting the power outage condition comprises:
    receiving a trigger for advance protection in response to a power-outage-causing condition.

7. The method as in claim 1, further comprising:
    determining a power restoration after the power outage condition; and
    in response to the power restoration, routing traffic to one or more select neighbor nodes having the same power grid connectivity of the particular node.

8. The method as in claim 7, further comprising:
   determining that the one or more select neighbor nodes having preferred routing metrics have power from the grid; and
   in response, resuming routing traffic from the particular node to the one or more select neighbor nodes having preferred routing metrics.

9. The method as in claim 1, wherein diverse power grid connectivity comprises a different phase of a polyphase electrical system as the grid source.

10. The method as in claim 1, wherein diverse power grid connectivity comprises electrical power sourced from a different transformer of the grid.

11. An apparatus, comprising:
   a power supply adapted to receive electrical power from a grid source;
   a network interface adapted to communicate in a computer network;
   a processor coupled to the network interface and adapted to execute one or more processes; and
   a memory configured to store a process executable by the processor, the process when executed operable to:
      determine routing metrics to a plurality of neighbor nodes of the apparatus in the computer network;
      determine power grid connectivity of the plurality of neighbor nodes by the apparatus, wherein determining the power grid connectivity of the plurality of neighbor nodes includes determining which transformer sources electrical power for each of the plurality of neighbor nodes or determining which polyphase electrical system acts as the grid source for each of the plurality of neighbor nodes;
      route traffic from the apparatus to one or more select neighbor nodes having preferred routing metrics;
      detect a power outage condition at the apparatus;
      in response to the power outage condition, route traffic from the apparatus to one or more select neighbor nodes having diverse power grid connectivity from the apparatus; and
      return to routing traffic to the one or more select neighbor nodes having preferred routing metrics in response to an end of the power outage condition.

12. The apparatus as in claim 11, wherein the process when executed is further operable to:
   select a first parent in a first directed acyclic graph (DAG) from the plurality of neighbor nodes based on the routing metrics; and
   select a second parent in a second DAG from the plurality of neighbor nodes based on the diverse power grid connectivity.

13. The apparatus as in claim 12, wherein the process when executed to select the second parent is further operable to select the second parent prior to detecting the power outage condition.

14. The apparatus as in claim 11, wherein the power outage condition is detected based on operating on backup power when the grid source power is down.

15. The apparatus as in claim 11, wherein the process when executed to detect the power outage condition is further operable to:
   receive a trigger for advance protection in response to a power-outage-causing condition.

16. The apparatus as in claim 11, wherein the process when executed is further operable to:
   determine a power restoration after the power outage condition; and
   in response to the power restoration, route traffic to one or more select neighbor nodes having the same power grid connectivity of the apparatus.

17. The apparatus as in claim 16, wherein the process when executed is further operable to:
   determine that the one or more select neighbor nodes having preferred routing metrics have power from the grid; and
   in response, resume routing traffic to the one or more select neighbor nodes having preferred routing metrics.

18. The apparatus as in claim 11, wherein diverse power grid connectivity a different phase of a polyphase electrical system as the grid source or electrical power sourced from a different transformer of the grid.

19. A tangible, non-transitory, computer-readable media having software encoded thereon, the software when executed by a processor operable to:
   determine, by a particular node, routing metrics to a plurality of neighbor nodes of the particular node in the computer network;
   determine power grid connectivity of the plurality of neighbor nodes by the particular node, wherein determining the power grid connectivity of the plurality of neighbor nodes includes determining which transformer sources electrical power for each of the plurality of neighbor nodes or determining which polyphase electrical system acts as the grid source for each of the plurality of neighbor nodes;
   route traffic from the particular node to one or more select neighbor nodes having preferred routing metrics;
   detect a power outage condition at the particular node;
   in response to the power outage condition, route traffic from the particular node to one or more select neighbor nodes having diverse power grid connectivity from the particular node; and
   return to routing traffic to the one or more select neighbor nodes having preferred routing metrics in response to an end of the power outage condition.

20. The computer-readable media as in claim 19, wherein the software when executed is further operable to:
   select a first parent in a first directed acyclic graph (DAG) from the plurality of neighbor nodes based on the routing metrics; and
   select a second parent in a second DAG from the plurality of neighbor nodes based on the diverse power grid connectivity.

21. The computer-readable media as in claim 19, wherein the software when executed to detect the power outage condition is further operable to:
   receive a trigger for advance protection in response to a power-outage-causing condition.

22. The computer-readable media as in claim 19, wherein the software when executed is further operable to:
   determine a power restoration after the power outage condition; and
   in response to the power restoration, route traffic to one or more select neighbor nodes having the same power grid connectivity of the particular node.

* * * * *